United States Patent [19]
Nelson et al.

[11] Patent Number: 5,551,475
[45] Date of Patent: Sep. 3, 1996

[54] PRESSURE RELIEF VALVE

[75] Inventors: Paul K. Nelson, Shoreview; Jerry K. Hammer, Jr., Hugo, both of Minn.

[73] Assignee: The Specialty Mfg. Co., St. Paul, Minn.

[21] Appl. No.: 300,142

[22] Filed: Sep. 2, 1994

[51] Int. Cl.[6] .................................................. F16K 17/08
[52] U.S. Cl. ........................................ 137/509; 251/284
[58] Field of Search .................................. 137/509, 538, 137/510; 251/284

[56] References Cited

U.S. PATENT DOCUMENTS

| | | | |
|---|---|---|---|
| 1,353,098 | 9/1920 | Wainwright | 137/509 |
| 3,087,510 | 4/1963 | Normand | 137/509 |
| 3,224,461 | 12/1965 | Kurek | 137/509 |
| 3,288,166 | 11/1966 | Wagner | 137/509 |
| 3,452,776 | 7/1969 | Chenoweth | 137/509 X |
| 4,192,346 | 3/1980 | Iizumi | 137/509 X |

FOREIGN PATENT DOCUMENTS

| | | | |
|---|---|---|---|
| 517737 | 7/1976 | U.S.S.R. | 137/509 |
| 524035 | 10/1976 | U.S.S.R. | 137/509 |

*Primary Examiner*—Stephen M. Hepperle
*Attorney, Agent, or Firm*—Patterson & Keough, P.A.

[57] ABSTRACT

An improved adjustable pressure relief valve having an adjustable biasing apparatus engaged thereto and exerting a biasing force on a fluid valving device. The valving device has a pressure bearing component that defines a fluid retaining boundary and is acted upon by a fluid under pressure. The fluid pressure exerts a force upon the fluid bearing component counter to the biasing force acting upon the fluid bearing component. The improvement comprises a pressure bearing component retaining device disposed within the pressure relief valve for presenting a barrier to the pressure bearing component, whereby the fluid retaining boundary defined by the pressure bearing component of the valve is maintained in the event of disengagement of the adjustable biasing apparatus from the fluid valving device of the pressure relief valve while the fluid under pressure is acting on the valving device.

3 Claims, 1 Drawing Sheet

PRESSURE RELIEF VALVE

TECHNICAL FIELD

The present invention relates to an adjustable pressure relief valve. More particularly, the invention relates to an improved pressure relief valve especially designed such that all the pressure bearing components of the valve are retained within the body of the valve in the event that the pressure adjustment is inadvertently removed while the valve is under pressure.

BACKGROUND OF THE INVENTION

Adjustable pressure relief valves are known. Such pressure relief valves are used, for instance, in conjunction with cleaning devices that utilize high pressure water, such as are found in car wash facilities. In certain applications such pressures may be as much as 1500 pounds per square inch. The pressure relief valve is used as a safety device to vent pressure in the event that the pressure exceeds a selected setting. Some pressure relief valves have a fixed pressure above which the valve vents. Other valves have a pressure adjuster for selectively varying the pressure above which the valve vents. A pressure adjuster comprises a component of the pressure relief valve to permit an operator to readily adjust the pressure at which the pressure relief valve opens and vents pressure. The pressure adjuster may set by hand or by use of a turning instrument, such as a wrench or the like.

A known pressure relief valve has a body section with pressure bearing components contained therein. A pressure adjuster is threadedly engaged with the body. A coil spring contained within the adjuster bears on the pressure bearing components contained within the body, urging such components into a sealing engagement with a valve seat. By rotating the pressure adjuster on the threads, the biasing force exerted by the spring upon the pressure bearing components is changed as desired. The pressure of incoming fluid to the valve body exerts pressure on the pressure bearing components that counters the biasing force exerted by the spring.

When the countering force exerted by the incoming fluid pressure exceeds the force exerted by the biasing spring, the spring is further compressed by the pressure bearing components and a venting port is exposed. Fluid pressure then escapes through the vent. When countering force exerted by the inlet fluid pressure again equals the biasing force exerted by the adjusting spring, the spring acts on the pressure bearing components, urging such components into a sealing engagement with a valve seat and thereby closing off the vent. The pressure bearing components define a portion of the fluid retaining boundary that maintains the fluid pressure integrity of the pressure relief valve.

A problem with the conventional device described above is that the pressure bearing components disposed within the body of pressure relief valve are retained therein by action of the biasing force exerted on the components by the adjusting spring. Notwithstanding prominent warnings to the contrary, the pressure adjuster is, on occasion, inadvertently removed while fluid inlet pressure is acting upon the pressure relief valve. Inadvertent removal of the pressure adjuster causes the pressure bearing components disposed within the body to be expelled therefrom at high velocity. This interrupts the fluid retaining boundary that maintains the fluid pressure integrity of the pressure relief valve. Moreover, these components become missiles that could cause injury to an operator. The escaping high pressure fluid poses an additional potential risk of injury to an operator.

Accordingly, it would be a decided advantage in the industry to have an adjustable pressure relief valve wherein the pressure bearing components of the valve are retained within the body of the valve in the event that the pressure adjuster is inadvertently removed while fluid pressure is acting on the pressure relief valve. Such a pressure relief valve would decidedly improve the safety of the working environment in which the valve was installed.

SUMMARY OF THE INVENTION

The present invention in large part solves the safety problem associated with the adjustable pressure relief valve outlined above. A retainer mechanism is positioned within the valve that retains the pressure bearing components within the body of the pressure relief valve, even in the absence of the valve adjuster. The piston of the valve is provided a space within which it can translate a certain distance before it abuts against the retainer. Such translation is caused by the pressure of the inlet fluid bearing upon the piston. The translation results in the opening of the pressure vent as required by the operation of the pressure relief valve. The retainer mechanism prevents the piston from being ejected from the body of the valve, even if the adjuster mechanism is inadvertently removed.

The invention is an adjustable pressure relief valve adapted to vent a fluid under pressure when the pressure exceeds a selected pressure limit. A valve body includes a fluid pressure inlet, a fluid pressure vent outlet, and a fluid passageway fluidly coupling the fluid pressure inlet to ? the fluid pressure vent outlet. A valve has a valve stem and a valve seat disposed within said fluid passageway. The valve stem is adapted to selectively, sealingly engage the valve seat along a fluid boundary and has a pressure bearing face presented to the fluid under pressure whereby the valve stem can be unseated from the seat by the fluid under pressure. A pressure adjuster is operably engaged with the valve body and exerts a selectively variable bias on the valve stem, the bias urging the valve stem into sealing engagement with the seat. A valve stem retainer is operably coupled to the valve body and is adapted to restrain the valve stem within the fluid passageway in the event that the pressure adjuster is disengaged from the valve body.

DETAILED DESCRIPTION OF THE DRAWINGS

Figure 1:
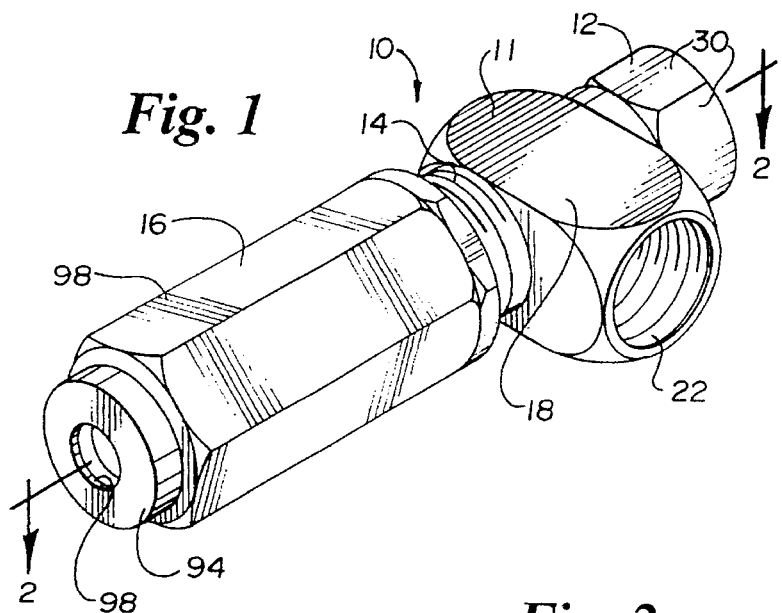
FIG. 1 is a perspective view of the improved adjustable pressure relief valve of the present invention.

The improved pressure relief valve of the present invention is shown generally at 10. The pressure relief valve 10 has four major subcomponents; body 11, vent adapter 12, adjuster adapter 14, and pressure adjuster 16.

Body 11 is a fitting having a generally rectangular in cross-sectional shape. The exterior surface of body 11 is defined by four flats 18 with the intersecting corners thereof being rounded off. The flats 18 facilitate gripping body 11 with suitable wrenches and the like when connecting the pressure relief valve to pressure inlet conduits and pressure vent conduits (not shown). Body 11 is preferably milled from a solid piece of brass.

A transverse, intersecting threaded passageway 20 is defined within body 11. Passageway 20 is arranged in a T shape within body 11. Passageway 20 has three openings to the exterior of body 11; inlet opening 22, vent opening 24, and adjuster opening 25. Inlet opening 22 is adapted for threaded engagement with a conduit (not shown) delivering high pressure fluid to pressure relief valve 10. Such high pressure fluid may be water at 1500 pounds per square inch in some applications. Vent opening 24 is adapted to threadingly receive vent adapter 12 threaded therein.

Vent adapter 12 is effectively a sleeve that accommodates the connecting of a vent conduit (not shown) to the pressure relief valve 10. Vent adapter 12 has exterior threads 26 formed thereon designed to threadingly engage the interior threads of threaded passageway 20 proximate the vent opening 24 thereof. An elastomeric O-ring 28 is disposed proximate the vent opening 24 to effect a fluid tight seal between the vent adapter 12 and the body 11. A hex head 30 is formed on the exterior surface of vent adapter 12 in order to facilitate engagement of a wrench or the like for turning vent adapter 12 into body 11 and for stabilizing vent adapter 12 when connecting a vent conduit (not shown) thereto.

A central passageway 31 is defined within vent adapter 12. The first portion of central passageway 31 is threaded connector 32. Threaded connector 32 is designed to threadedly engage a fluid vent conduit (not shown) connected to pressure relief valve 10. A tapered fluid passageway 36 fluidly connects the threaded connector 32 portion of central passageway 31 to the neck 38 portion thereof. Neck 38 defines a fluid passageway having a relatively reduced cross-sectional area. Neck 38 is fluidly connected to seat retainer 40.

Seat retainer 40 has an expanded diameter in comparison to the diameter of neck 38. A seat 42 is closely fit within the confines of seat retainer 40. Seat 42 is preferably made of a steel material. A fluid tight seal is maintained between seat 42 and seat retainer 40 by O ring 44. Seat 42 has a fluid passageway 46 defined therein that is fluidly connected to neck 38.

The adjuster adapter 14 of pressure relief valve 10 is preferably formed in a generally elongated cylindrical shape. Adjuster adapter 14 is preferably made of brass. Two sets of threads 48, 50 are formed on the exterior surface thereof such that substantially the entire external surface of adjuster adapter 14 is threaded. The first set of threads 48 is adapted to threadingly engage the threads of transverse passageway 20 proximate adjuster opening 25. An elastomeric 0 ring 54 is disposed between adjuster adapter 14 and body 11 proximate adjuster opening 25 to ensure a fluid tight seal therebetween.

The second set of exterior threads 50 covers the remaining exterior portion of adjuster adapter 14. Threads 50 are designed to threadingly engage pressure adjuster 16. The threads 50 are cut over a relatively lengthy portion of adjuster adapter 14 in order to provide a wide range of pressure adjustment options for the pressure adjuster 16.

Adjuster adapter 14 has a longitudinal central cylinder bore 56 defined therein. Cylinder bore 56 is a relatively smooth surface in order to readily accommodate the translation of various components installed therein with a minimum of frictional resistance.

The first such component installed within cylinder bore 56 is piston 58. Piston 58 is preferably made of a steel material and is generally cylindrical in exterior shape having an outside diameter that is only slightly less than the diameter of cylinder bore 56. Piston 58 is designed to slidingly translate within cylinder bore 56 responsive to pressure differentials acting thereon and comprises the valve stem of the pressure relief valve 10.

Figure 2:
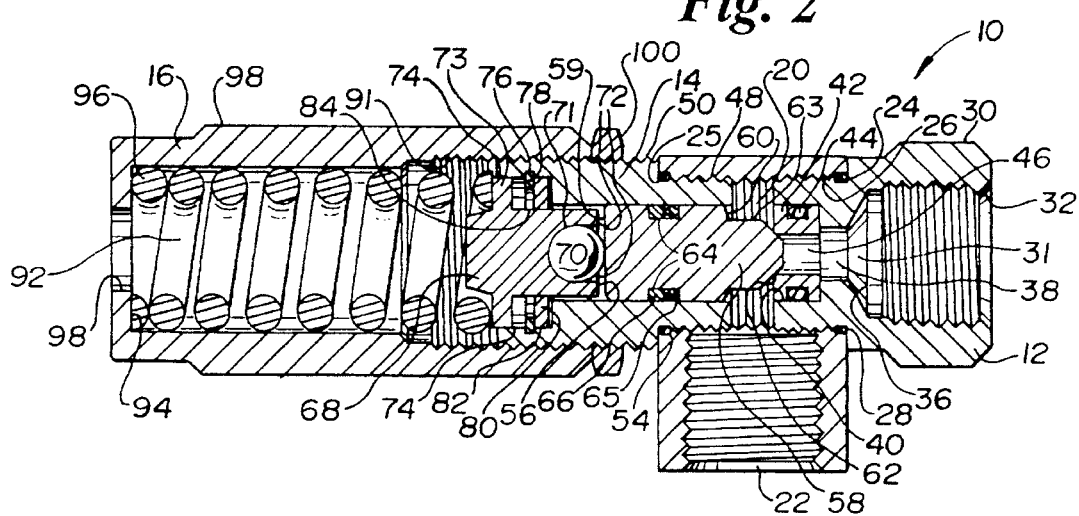
FIG. 2 is a sectional view of the pressure relief valve taken along line 2—2 of FIG. 1.

Piston 58 has a first flat end 59 that faces to the left, as depicted in FIG. 2. The opposed second end of piston 58 faces to the right, as depicted in FIG. 2. The second end of piston 58 has annular, tapered pressure bearing faces 60, 62 joined by cylindrical face 63. Pressure bearing face 62 is designed to project partially into fluid passageway 46 of seat 42. In its seated position as depicted in FIG. 2, piston 58 is biased to the right and pressure bearing face 62 abuts seat 42, effecting a fluid tight seal therewith.

An annular groove 64 is defined around the piston 58. An elastomeric quad ring 65 is compressively held within groove 64 by cylinder bore 56 to effect a fluid tight seal therewith. The quad ring 65 is substantially rectangular in cross section, as distinct from the substantially circular cross sectional shape of an O ring. A teflon, polytetrafluoroethylene, ring 66 is also disposed within groove 64 adjacent to the quad ring 65. The, teflon ring 66 acts to center piston 58 within cylinder bore 56 and assists in facilitating the sliding translation of piston 58 within cylinder bore 56.

A second component carried within cylinder bore 56 is actuator 68. Actuator 68 is a generally cylindrical device having an exterior diameter that is substantially less than the diameter of cylinder bore 56, leaving a distinct gap therebetween. Accordingly, a loose fit is effected between actuator 68 and cylinder bore 56. Actuator 68 is preferably formed of a brass material.

A hardened steel pressure bearing ball 70 is compressively retained within recess 71 formed within face 72 of actuator 68. Recess 71 is defined on the central longitudinal access of actuator 68. The pressure bearing ball 70 projects slightly to the right of face 72, as depicted in FIG. 2. Pressure bearing ball 70 makes contact with the flat end 59 of piston 58 at the very center thereof. By this means of transferring pressure between piston 58 and actuator 68, no off center forces are generated that would tend to make either piston 58 or actuator 68 bind within cylinder bore 56.

A spring engaging shoulder 73 is formed proximate the second end of actuator 68. Spring engaging shoulder 73 is adapted to be retained in sliding engagement with counter bore 74 formed at the end of cylinder bore 56.

A clip groove 76 is formed within the counter bore 74. Clip groove 76 is adapted to receive e-clip 78 therein. E-clip 78 is a conventional device that may be radially compressed by needle nosed pliers or the like in order to insert e-clip 78 within counter bore 74. E-clip 78 is then released to expand into clip groove 76. E-clip 78 holds retainer ring 80 within counter bore 74.

Retainer ring 80 has an outside diameter 82 that is slightly less than the diameter of counter bore 74. Retainer ring 80 has a bore 84 defined therein. The diameter of bore 84 is just slightly greater than the diameter of actuator 68, such that actuator 68 is capable of sliding a translation within bore 84. It is significant that the diameter of bore 84 is substantially less than the diameter of piston 58. Accordingly, retainer ring 80 acts to retain piston 58 within cylinder bore 56 when the piston 58 is brought into abutting engagement with retainer ring 80.

Pressure adjuster 16 is an elongated device preferably made of a brass material. The exterior surface of pressure adjuster 16 is formed in a hexagonal shape in order to provide a bearing surface for a wrench or other suitable turning instrument. Pressure adjuster 16 has internal threads 91 adapted to threadingly engage the second set of exterior threads 50 of adjuster adapter 14. A central bore 92 is defined within pressure adjuster 16. The left end of pressure adjuster 16, as depicted in FIG. 2, comprises a spring retainer 94. A bore 98 formed in spring retainer 94 serves to equalize the pressure within and without pressure adjuster 16.

A coil spring 96 is disposed within bore 92. A first end of coil spring 96 abuts spring retainer 94. A second end of spring 96 bears against spring engaging shoulder 73 of actuator 68. From a selected point on the exterior threads 50 of adjuster adapter 14, threading pressure adjuster 16 further thereon causes adjuster adjuster 16 to translate to the right as depicted in FIG. 2 and thereby increases the compression of spring 96. This action increases the biasing force acting on the shoulder 73 of actuator 68. A lock nut 100 is utilized to hold the pressure adjuster 16 in the desired position on threads 50.

In operation, pressure adjuster 16 of pressure relief valve 10 is threaded onto pressure adapter 14, compressing spring 96. Such compression acts to bias actuator 68 to the right, as depicted in FIG. 2. This bias is transmitted to piston 58 by means of pressure bearing ball 70. The spring bias urges the pressure bearing face 62 of piston 58 into a sealing engagement with seat 42. The greater the bias exerted by the spring 96, the greater the fluid pressure that is required to unseat the piston 58, overcoming the bias and resulting in venting of the fluid pressure.

Fluid pressure is admitted to pressure relief valve 10 through inlet opening 22. The fluid pressure acts upon annular tapered pressure bearing faces 60, 62. A component of such pressure, that is a function of the angle of the taper and the area of pressure bearing faces 60, 62, acts opposite to the force generated by spring 96. When the fluid pressure component acting upon annular tapered pressure bearing faces 60, 62 exceeds the bias exerted by spring 96, piston 58 translates to the left unseating pressure bearing face 62 from seat 42. Fluid pressure is then vented through fluid passageway 46 and out central passageway 31, as depicted by arrow 102 in FIG. 3. When this venting reduces the incoming fluid pressure to a pressure for which the fluid pressure component acting upon annular tapered pressure bearing faces 60, 62 is less than the bias exerted by spring 96, spring 96 once again urges piston 58 to the right into a sealing engagement with seat 42.

Figure 3:
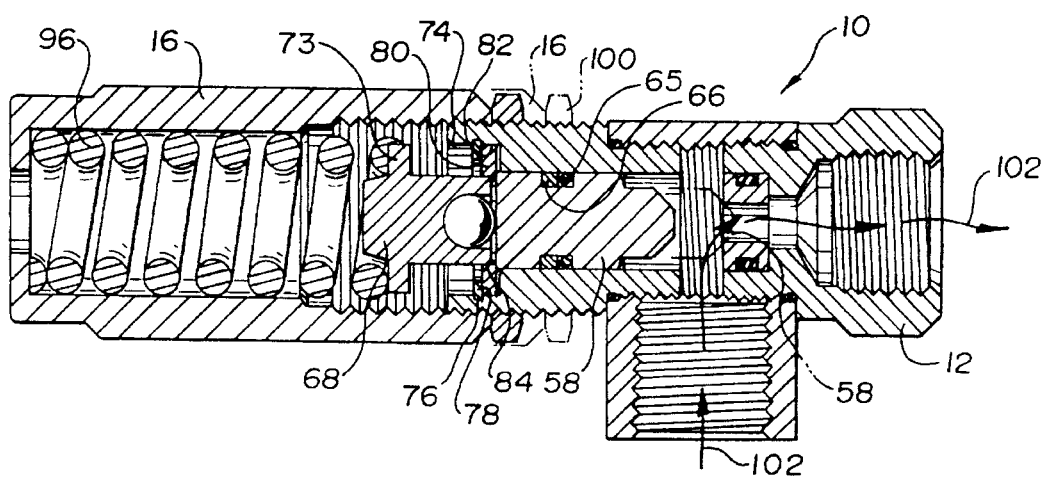
FIG. 3 is similar to FIG. 2, but with the pressure relief valve depicted as being under pressure and the pressure adjusting cap being partially backed off with the valve piston positioned in abutting relationship with the retainer ring.

It is not intended that the pressure adjuster 16 be backed off to a point of disengagement with pressure relief valve 10 while fluid pressure is acting upon pressure relief valve 10. Nonetheless, through operator inexperience or inadvertence, it is occasionally the case that pressure adjuster 16 is disengaged from pressure relief valve 10 while pressure relief valve 10 is under fluid pressure. Referring to FIG. 3, pressure relief valve 10 is depicted with the pressure adjuster 16 in the partially backed off condition from the position of pressure adjuster 16 indicated in phantom. The position of the pressure adjuster 16 that is depicted in phantom corresponds to the position thereof as depicted in FIG. 2.

Fluid under pressure, as indicated by arrow 102, is being provided to pressure relief valve 10. In this condition, rotation of pressure adjuster 16 has resulted in the translation of pressure adjuster 16 relative to pressure adapter 14. Accordingly, the bias exerted by spring 96 on actuator 68 has been substantially reduced. This reduction in bias permits the incoming of fluid pressure to force piston 58 to the left as indicated out of the seated position, indicated in phantom. This action fully opens pressure relief valve 10 allowing the incoming fluid pressure to be vented through normal channels. Piston 58 is constrained within cylinder bore 56 by retainer ring 80. The fluid boundary is maintained by the quad ring 65 borne by piston 58. The fluid pressure integrity of the pressure relief valve 10 is fully maintained.

Further left handed rotation of pressure adjuster 16 will cause pressure adjuster 16 to continue to move toward the left, as depicted in FIG. 3. Ultimately, pressure adjuster 16 will become disengaged from adjuster adapter 14 of pressure relief valve 10. At this point, actuator 68 typically falls free of pressure relief valve 10 as a result of only a small portion of actuator 68 being loosely retained within bore 84 of retainer ring 80. In this condition, piston 58 is retained within cylinder bore 56 by retainer ring 80 as a result of piston 58 being caused to abut retainer ring 80. Piston 58 is caused to be so retained by the fact that the diameter of bore 84 of retainer ring 80 is substantially less than the diameter of piston 58. The effective fluid seal established by a quad ring 65 is thereby held intact, preventing the fluid under pressure from escaping through cylinder bore 56. The avenue of relief for inlet fluid under pressure is as indicated by arrow 102, depicting venting through vent adapter 12. Even with the pressure adjuster 16 fully disengaged from the pressure relief valve 10, the fluid boundary is maintained and the fluid pressure integrity of the pressure relief valve 10 is fully maintained. The possibility of escaping fluid under great pressure has been foreclosed.

The present invention has now been described with reference to an embodiment thereof. It will be apparent to those skilled in the art that many changes can be made in the embodiment described without departing from the scope of the invention. Thus, the scope of the present invention should not be limited to the structures described therein, but rather by the structures described by the language of the claims, and the equivalents of those structures.

What is claimed:

1. An improved adjustable pressure relief valve having a valve body and an adjustable biasing apparatus engaged thereto and exerting a biasing force on a fluid valve device, the valve device having a piston defining a fluid boundary and being acted upon by a fluid under pressure, the fluid pressure exerting a force upon the piston counter to said biasing force, the improvement comprising:

an actuator adapted for operably, abuttably contacting the piston, the actuator presenting a longitudinal axis, the piston having a sealing end oriented within the valve body for inhibiting flow within the valve when the pressure is insufficient to overcome the biasing force and a second end opposite the sealing end adapted for operable, abuttable contact with actuator;

and a retainer ring removably disposed within the valve body for presenting a barrier to the piston, the retainer ring having a bore with a diameter less than the piston along an axis passing through the center of the bore, whereby the fluid boundary defined by the piston is maintained in the event of disengagement of the adjustable biasing apparatus from the fluid valving device of the pressure relief valve;

where a portion of the actuator with a diameter less than the diameter of the bore of the retaining ring passes through the bore of the ring to contact the piston with a portion of the actuator on either side of the plane defined by the center of the ring and thereby to transmit the biasing force to the piston.

2. An improved adjustable pressure relief valve as claimed in claim 1 wherein:

the valve body has structure defining a fluid pressure inlet, a fluid pressure vent outlet, a fluid passageway fluidly coupling said fluid pressure inlet to said fluid pressure vent outlet and a valve seat in said fluid passageway before the fluid pressure vent outlet; and the piston has a valve stem with the sealing end disposed within said fluid passageway, the valve stem adapted to selectively, sealingly engage the valve seat with the sealing end along a fluid boundary, the valve stem having a pressure bearing face presented to the fluid under pressure whereby the valve stem can be unseated from the seat by the fluid under pressure.

3. An improved adjustable pressure relief valve as claimed in claim 2 wherein the fluid pressure inlet and fluid pressure vent outlet are at a right angle relative to each other.

* * * * *